United States Patent [19]
Welschof

[11] Patent Number: 5,803,814
[45] Date of Patent: Sep. 8, 1998

[54] TRIPOD JOINT WITH SPHERICAL ARMS

[75] Inventor: Hans-Heinrich Welschof, Rodenbach, Germany

[73] Assignee: Lohr & Bromkamp GmbH, Offenbach am Main, Germany

[21] Appl. No.: 821,522

[22] Filed: Mar. 20, 1997

[30] Foreign Application Priority Data

Mar. 20, 1996 [DE] Germany ................. 196 10 916.7

[51] Int. Cl.$^6$ .................................................. F16D 3/205
[52] U.S. Cl. ........................... 464/111; 464/167; 464/905
[58] Field of Search .................... 464/111, 120, 464/122, 152, 139, 167, 905

[56] References Cited

U.S. PATENT DOCUMENTS

| | | | |
|---|---|---|---|
| 3,797,276 | 3/1974 | Orain | 464/167 |
| 4,741,723 | 5/1988 | Orain | 464/167 |
| 5,160,297 | 11/1992 | Uchman | 464/111 |
| 5,160,298 | 11/1992 | Schneider | 464/167 |
| 5,184,978 | 2/1993 | Fillmore et al. | 464/111 |
| 5,254,038 | 10/1993 | Schnider | 464/111 |
| 5,268,687 | 12/1993 | Genestre et al. | 464/111 |
| 5,277,660 | 1/1994 | Uchman | 464/111 |

FOREIGN PATENT DOCUMENTS

| | | |
|---|---|---|
| 0202968 | 11/1986 | European Pat. Off. . |
| 0610782 | 8/1994 | European Pat. Off. . |
| 3636243 | 5/1988 | Germany . |
| 3905566 | 3/1990 | Germany . |
| 4024534 | 2/1992 | Germany . |
| 4300793 | 7/1993 | Germany . |
| 1340644 | 12/1973 | United Kingdom . |

*Primary Examiner*—Eileen A. Dunn
*Attorney, Agent, or Firm*—Howard & Howard

[57] ABSTRACT

A constant velocity universal joint of the tripod type having an outer joint part with three axis-parallel recesses each forming circumferentially opposed pairs of running grooves. An inner joint part with three circumferentially distributed radial arms with spherical heads each engage one of the recesses. The joint also has guiding pieces for rolling contact members. The guiding pieces each comprise a radially extending cylindrical inner aperture radially movably and articulatably slidingly engaged by one of the spherical heads and longitudinally directed guiding grooves holding rolling contact members rolling in the running grooves. The guiding grooves are each provided with end stops at both ends and with a free rolling path available to the rolling contact members in the guiding grooves between the end stops.

13 Claims, 5 Drawing Sheets

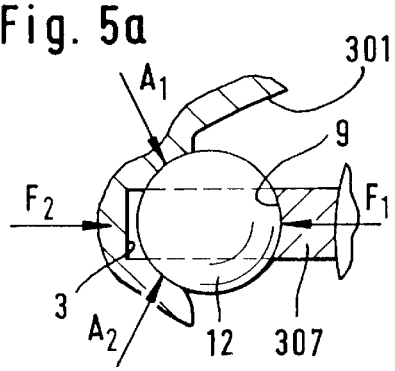
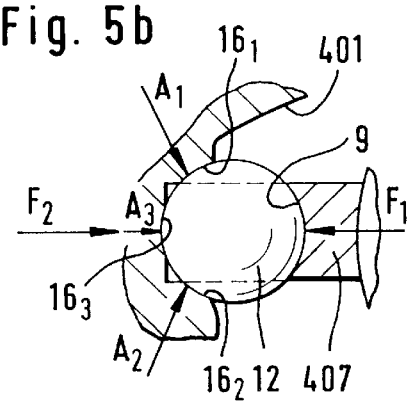
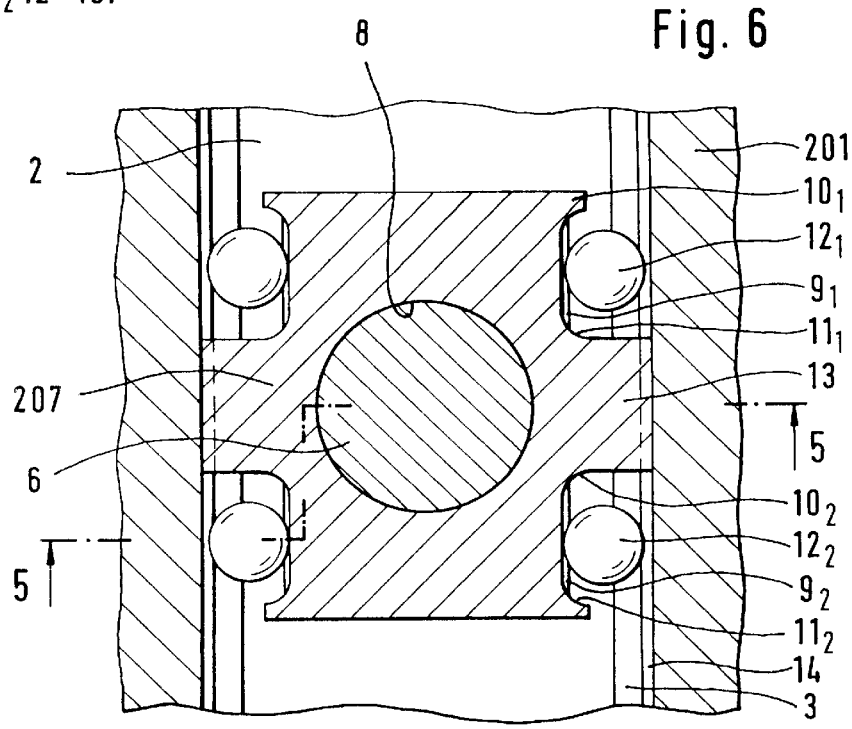

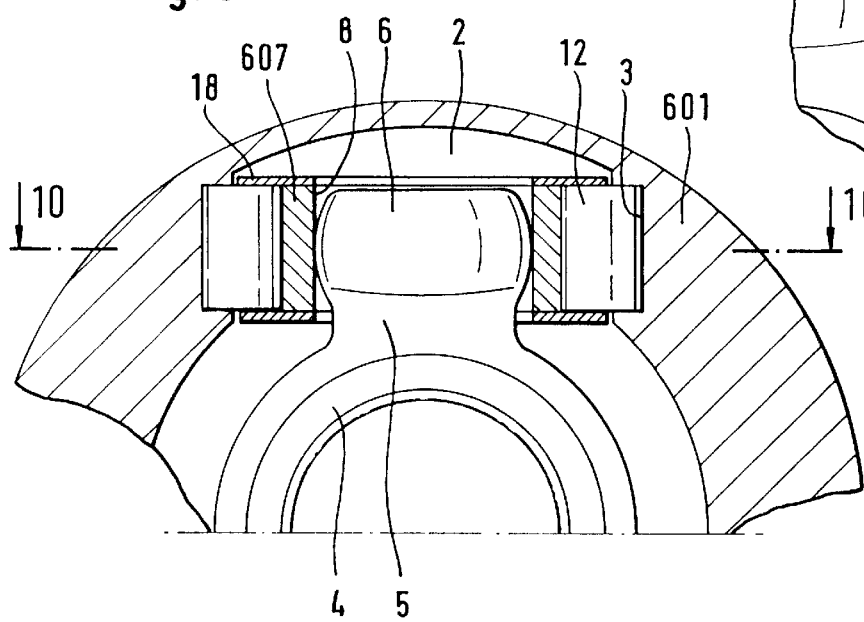
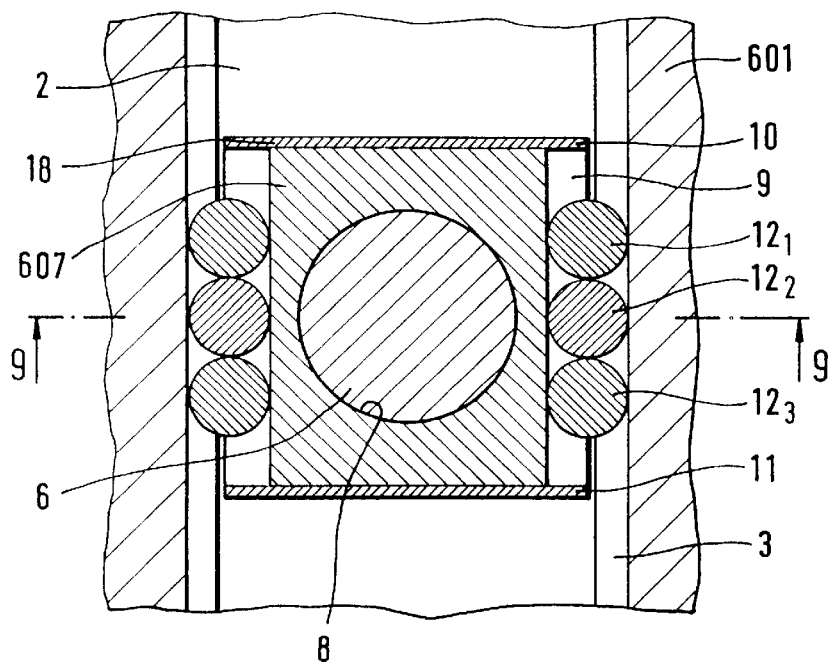

TRIPOD JOINT WITH SPHERICAL ARMS

BACKGROUND OF THE INVENTION

The invention relates to a constant velocity universal joint of the tripod type having an outer joint part with three axis-parallel recesses each forming circumferentially opposed pairs of running grooves, an inner joint part with three circumferentially distributed radial arms with spherical heads which each engage one of the recesses, and guiding pieces for rolling contact members. The guiding pieces each comprise a radially extending cylindrical inner aperture radially movably and articulatably slidingly engaged by one of the spherical heads and each comprise longitudinally directed guiding grooves holding rolling contact members which roll in the running grooves.

A joint of the above-mentioned type is described in DE 40 24 534 A1. To reduce the friction forces, the rolling contact members of each running groove of the joint are held in the respective recess in a closed ball circulation guide which is firmly connected to the guiding piece. Such an embodiment is extremely expensive and the ball circulation guide must be produced very accurately in order to achieve the expected smooth running characteristics and low noise performance.

DE 39 05 566 C1 proposes a joint of a similar design wherein the rolling contact members of each running groove are held in the respective recess in a guiding groove in the guiding piece. The guiding groove is open on one side. To ensure the rolling contact members are held in such a way they are not lost, a cage element design is provided wherein the rolling contact members are held in cage windows so as to be constantly associated with one another in a specific way. Such an embodiment is expensive and consists of many parts and complicates the assembly.

It is therefore the object of the present invention to provide a constant velocity universal joint of the initially mentioned type which ensures good results as regards low friction losses and low noise generation while at the same time comprising a simple design and causing low production costs.

SUMMARY OF THE INVENTION

The objective is achieved by a constant velocity joint of said type having guiding grooves with end stops at both ends and between the end stops a free rolling path available to the rolling contact members in the guiding grooves.

This extremely simple design ensures that, during operation, with the joint in the articulated position, the rolling contact members roll in a substantially friction-free way between the guiding grooves in the guiding pieces and the running grooves in the outer joint part. At the same time, the rolling contact members are guided such that they cannot be lost. The cross-section of the guiding grooves and of the running grooves has to be such that the rolling members are form-fittingly embraced in the cross-section of the joint. With the exception of the shape of the guiding grooves, the guiding pieces can be provided in the form of simple plate-shaped punched parts. Advantageous embodiments and modifications will be described below in greater detail.

In a first variation, a plurality of rolling contact members can be held in one guiding groove respectively between the axial end stops. Preferably there are three rolling contact members in each case to achieve a sufficiently large supporting base with a small number of rolling contact members.

According to a further variation, one rolling contact member is held between two axial stops in each guiding groove with a plurality of guiding grooves, especially two guiding grooves, arranged one behind the other being formed on each side of a guiding piece. Again, by suitably arranging the end stops it is possible to provide an adequate supporting base. Friction is reduced because the rolling contact members cannot contact one another.

According to a first advantageous embodiment, the end stops can each be produced integral with the guiding pieces. According to a second embodiment, the end stops—with reference to the longitudinal axis of the joint—can be placed transversely onto the guiding pieces and consist of plastics. According to a third embodiment, end stops in the form of plate metal elements can be slid transversely onto the guiding pieces with reference to the joint axis and can be positioned thereon in a form-fitting way.

A further contribution for simplifying the joint consists in that the radial thickness of the guiding pieces is smaller than the diameter of the rolling contact members provided in the form of balls. It is particularly advantageous if the guiding pieces are produced as simple punched parts. As in such a case, the width of the guiding grooves is relatively small, it is particularly advantageous if the guiding pieces are in direct contact with the guiding tracks in the outer joint part. The guiding tracks may be in the form of recessed longitudinal flutes inside the running grooves or they may be formed directly by the running grooves themselves. In the first case, it is advantageous if the guiding pieces themselves directly engage the longitudinal grooves. In the second case, engagement can be created by formed parts placed onto the guiding pieces.

To reduce friction it is also advantageous if the guiding grooves in the outer joint part optionally comprise two or three parallel contact regions for the rolling contact members, especially if they are provided in the form of balls.

BRIEF DESCRIPTION OF THE DRAWINGS

Preferred embodiments comprising the subject of the invention and preferred variants are illustrated in the drawings and will be described with reference to these.

FIG. 5 is a partial cross-section of a third embodiment of a joint in accordance with the invention;

FIG. 5a and 5b show a detail of FIG. 5 in a modified embodiment in the region of the guiding grooves;

FIG. 6 is a cross-sectional view taken along line 6—6 of FIG. 5 through a guiding,piece in the center of a rolling contact member, note that line 5—5 indicates the plane of FIG. 5;

FIG. 9 is a partial cross-section of a fifth embodiment of an inventive joint having rolling contact members in the form of rollers;

FIG. 9a shows a detail of FIG. 9 in a modified embodiment in the region of the running grooves;

FIG. 10 is a cross-sectional view taken along line 10—10 of FIG. 9 through a guiding piece in the center of a rolling contact member; and FIG. 10a shows a detail of FIG. 10 along a longitudinal section through a guiding piece.

DETAILED DESCRIPTION OF A PREFERRED EMBODIMENT

Figure 1:
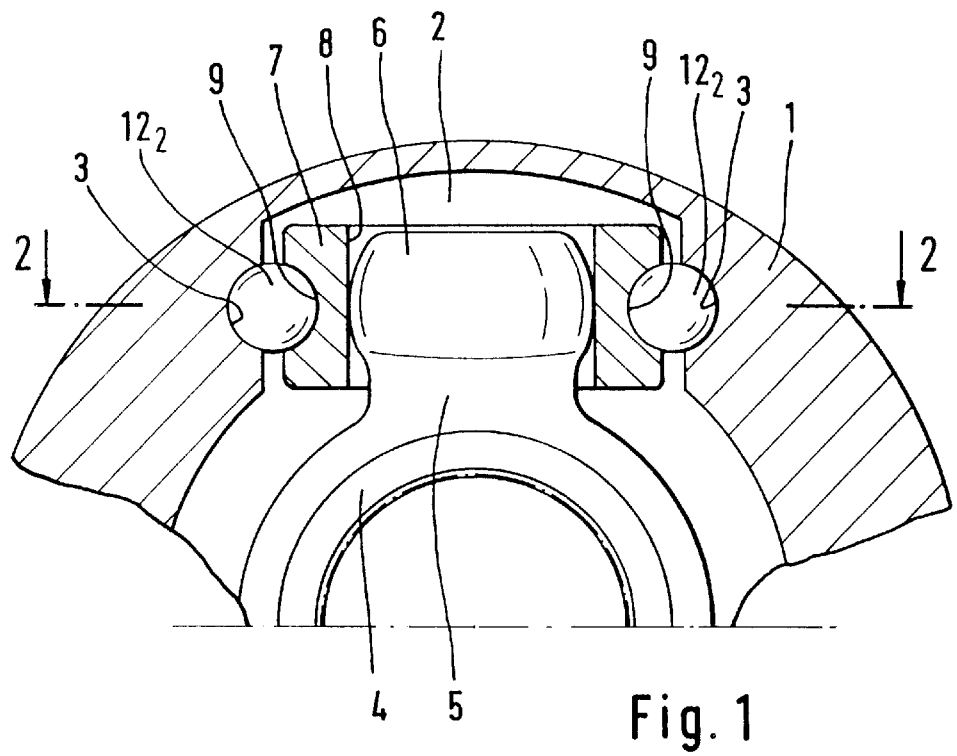
FIG. 1 is a partial cross-section of a first embodiment of a joint in accordance with the invention.
Figure 2:
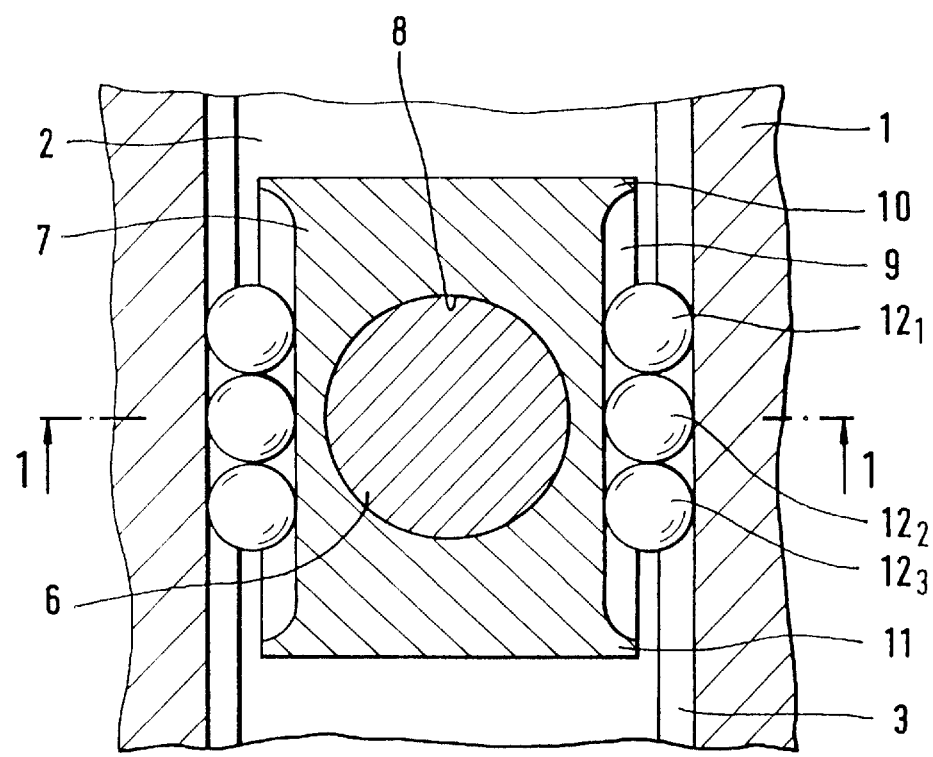
FIG. 2 is a cross-sectional view taken along line 2—2 of FIG. 1 through a guiding piece in the center of a rolling contact member, note that line 1—1 designates the plane of FIG. 1.

FIGS. 1 and 2 show an outer joint part 1 with one of three circumferentially distributed recesses 2 in which there is formed a pair of running grooves 3. An inner joint part 4 has one of three circumferentially distributed arms 5 illustrated. Each of the three arms 5 comprise a spherical head 6. Each of the spherical heads 6 is flattened at its end. A substantially rectangular guiding piece 7 is held on the spherical head 6. The spherical head 6 engages a radial cylindrical inner aperture 8 in the guiding piece 7. In the guiding piece 7 opposed guiding grooves 9 are provided. Each of the guiding grooves comprises end stops 10 and 11, with three rolling contact members $12_1$, $12_2$, $12_3$ in the form of balls being able to move axially freely between said end stops. Both the running grooves 3 and the guiding grooves 9 enclose the rolling contact members 12 in a form-fitting way.

Figure 3:
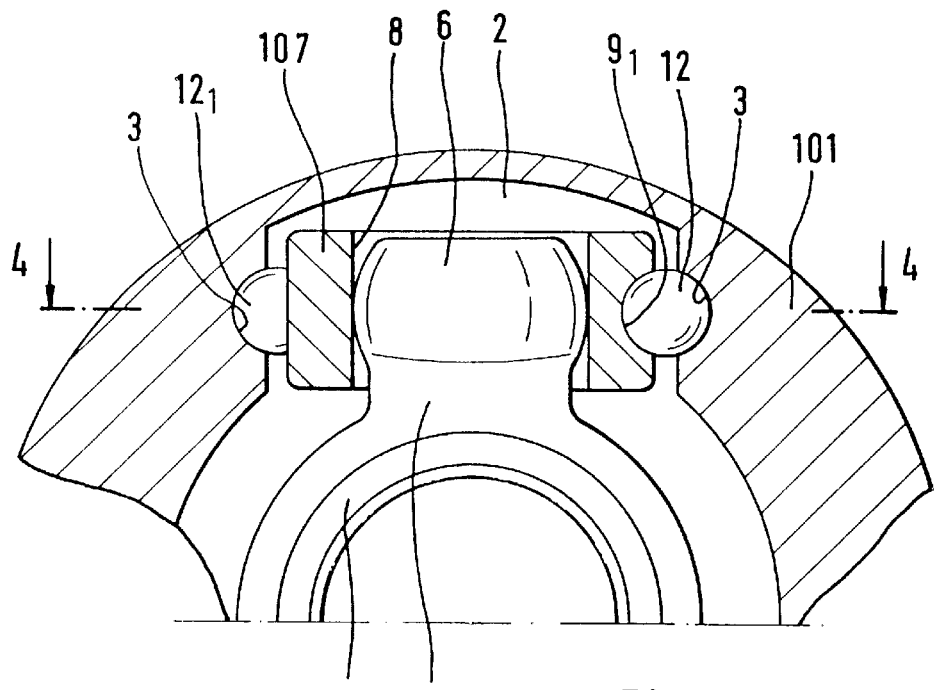
FIG. 3 is a partial cross-section of a second embodiment of a joint in accordance with the invention.
Figure 4:
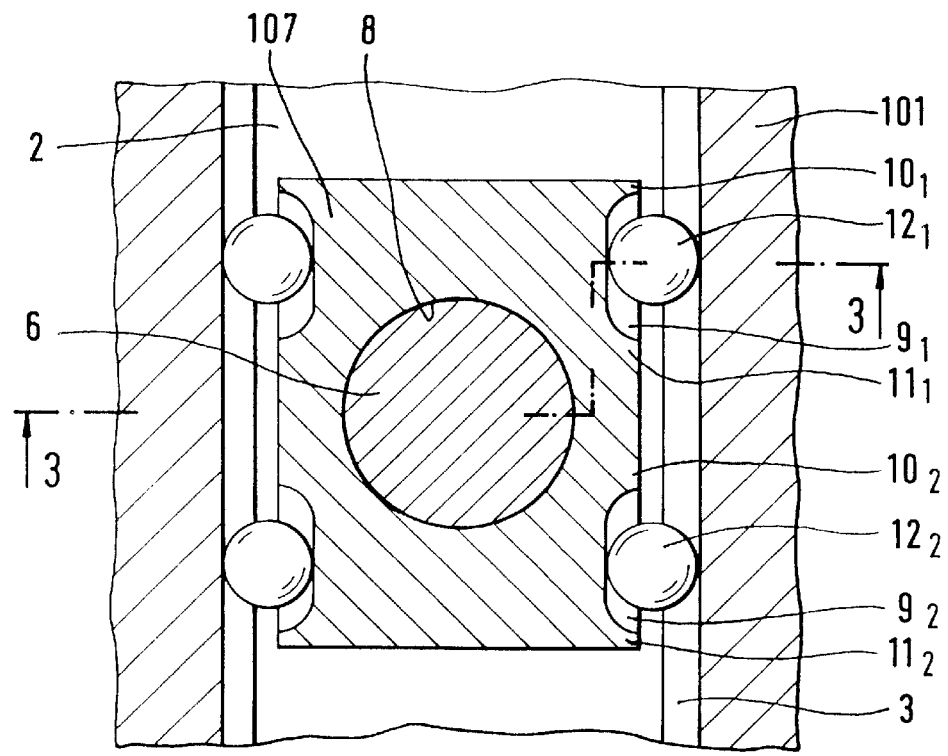
FIG. 4 is a cross-sectional view taken along line 4—4 of FIG. 3 through a guiding piece in the center of a rolling contact member, note that line 3—3 designates the plane of FIG. 3.

FIGS. 3 and 4 show an outer joint part 1 with one of three circumferentially distributed recesses 2 in which there is formed a pair of running grooves 3. They also show an inner joint part 4 with one of three circumferentially distributed arms 5 each comprising a spherical head 6. Each of the spherical heads 6 is flattened at its end. A substantially rectangular guiding piece 7 is held on the spherical head 6, with the spherical head 6 engaging a radial cylindrical inner aperture 8 in the guiding piece 7. On each side of the guiding piece 7 there are two guiding grooves $9_1$, $9_2$, which are axially delimited by axial stops $10_1$, $11_1$, $10_2$, $11_2$. Each of the guiding grooves $9_1$, $9_2$ receives a single rolling contact member $12_1$, $12_2$ in the form of a ball.

FIGS. 5 and 6 show an outer joint part 1 with one of three circumferentially distributed recesses 2 in which there is formed a pair of running grooves 3. They also show an inner joint part 4 with one of three circumferentially distributed arms 5 each comprising a spherical head 6. A substantially rectangular guiding piece 7 is held on the spherical head 6, with the spherical head 6 engaging a radial cylindrical inner aperture 8 in the guiding piece 7. On each side of the guiding piece are two guiding grooves $9_1$, $9_2$ axially delimited by axial stops $10_1$, $11_1$, $10_2$, $11_2$. Each of the guiding grooves $9_1$, $9_2$ receives a single rolling contact member $12_1$, $12_2$ in the form of a ball. The radial thickness of the guiding piece 7 is substantially smaller than the diameter of the rolling contact members $12_1$, $12_2$ in the form of balls. To ensure adequate guidance of the rolling contact members 12w, $12_2$ relative to the guiding piece 207, the region between the stops $11_1$, $10_2$ constitutes a guiding region 13 which engages a recessed guiding groove 14 provided in the center of the outer joint part 201 inside the running grooves 3.

FIG. 5 shows that in this way, the contact between the rolling contact members 12 provided in the form of balls and the running grooves 3 is limited to two parallel carrying regions $16_1$, $16_2$.

In FIG. 5a, the contact between the guiding piece 307, the rolling contact members $12_1$, $12_2$ and the running groove 3 is increased and it also illustrates forces $F_1$, $F_2$, $A_1$, $A_2$. The circumferential force $F_1$ applied by the guiding piece 307 to the rolling contact members 12 corresponds to the circumferential force $F_2$ applied by the outer joint part 301 to the rolling contact members 12. The circumferential force $F_2$ is divided into the track forces $A_1$, $A_2$ which comprise radial guiding components. $F_2$ is the resultant of the track forces $A_1$, $A_2$.

FIG. 5b shows a modification based on a guiding piece 407 with a greater thickness and thus having a guiding groove 14 with a greater width. The width of said guiding groove 14, relative to the running groove 3, is calculated to be such that the running groove 3 comprises three parallel carrying regions $16_1$, $16_2$, $16_3$ relative to the rolling contact members 12 provided in the form of balls.

The circumferential force $F_1$ applied by the guiding piece 407 to the rolling contact members 12 corresponds to the circumferential force $F_2$ applied by the outer joint part 401 to the rolling contact members. The circumferential force $F_2$ is divided into the track forces $A_1$, $A_2$, $A_3$ of which the first two comprise radial guiding components. $F_2$ is the resultant of the three track forces.

Figure 7:
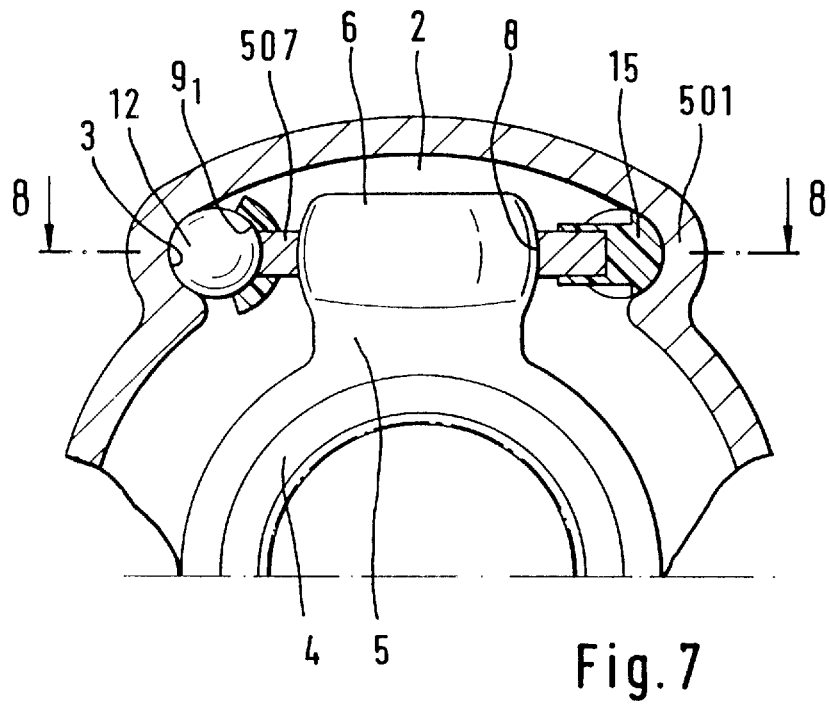
FIG. 7 is a partial section of a fourth embodiment of an inventive joint taken along section line 7—7 according to FIG. 8.
Figure 8:
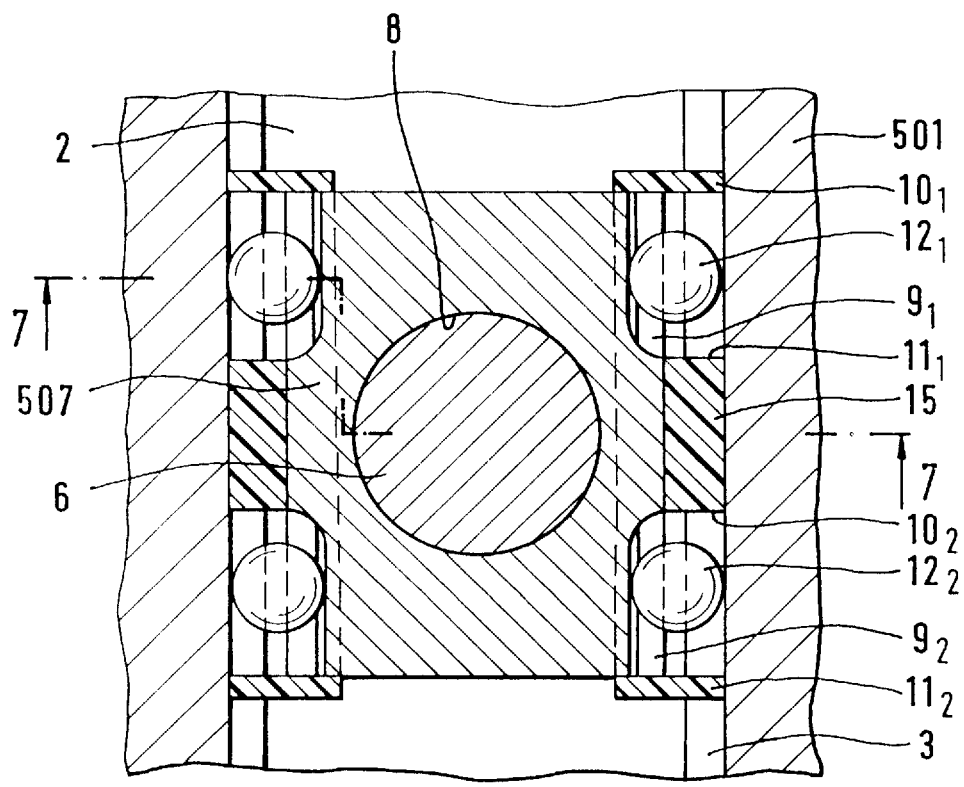
FIG. 8 is a partial cross-sectional view taken along line 8—8 of FIG. 7 through a guiding piece in the center of a rolling contact member.

FIGS. 7 and 8 show an outer joint part 501 with one of three circumferentially distributed recesses 2 in which there is formed a pair of running grooves 3. They also show an inner joint part 4 with one of three circumferentially distributed arms 5 with a spherical head 6. A substantially rectangular guiding piece 507 is held on the spherical head 6, with the spherical head 6 engaging a radial cylindrical inner aperture 8 in the guiding piece 507. On each side of the guiding piece 507 are two guiding grooves $9_1$, $9_2$ axially delimited by axial stops $10_1$, $11_2$, $10_2$, $11_2$. Again, the guiding piece 507 comprises a small radial thickness relative to the diameter of the rolling contact members $12_1$, $12_2$ provided in the form of balls. To ensure adequate support of the balls relative to the guiding piece 507 nevertheless, both side of the guiding piece 507 are provided with slide-on guiding elements 15 which form-fittingly engage the running grooves 3. The guiding elements 15, which may be made of plastic for example, at the same time constitute the end stops $10_1$, $10_2$, $11_1$, $11_2$ for the rolling contact members $12_1$, $12_2$ provided in the form of balls.

FIGS. 9 and 10 show an outer joint part 601 with one of three circumferentially distributed recesses 2 in which there is formed a pair of running grooves 3. They also show an inner joint part 4 with one of three circumferentially distributed arms 5 each comprising a spherical head 6. A substantially rectangular guiding piece 607 is held on the spherical head 6, with the spherical head 6 engaging a radial cylindrical inner aperture 8 in the guiding piece 607. The guiding piece 7 is provided with opposed guiding grooves 9 each comprising end stops 10, 11. In this embodiment, the guiding grooves 9 are formed by a plate metal element 18 slid onto the guiding piece 607. The plate metal element 18 at the same time forms the end stops 10, 11 for the rolling contact members $12_1$, $12_2$, $12_3$ which in this case are provided in the form of rollers. Accordingly, the cross-section of the running grooves 3 is rectangular in shape.

In FIG. 9a, the outer joint part 701 is provided with an inner plate metal sleeve 17 which is slotted in the region of the recesses 2 to form the running grooves 3 having a rectangular cross-sectional shape, with the outer joint part 701 being undercut-free in the radial direction. In this embodiment, the guiding grooves 9 are produced to be integral with the guiding piece 707.

FIG. 10a shows the shape of a plate metal element 18 whose longitudinal section is approximately box-shaped and which embraces the guiding piece 7.

Embodiments of the invention have been disclosed. However, a worker in this art would recognize that modification would come within the scope of this invention. Thus, the following claims should be reviewed to determine the fine scope of this invention.

I claim:

1. A constant velocity universal joint of the tripod type comprising:

an outer joint part with three axis-parallel recesses, each forming circumferentially opposed pairs of running grooves;

an inner joint part with three circumferentially distributed radial arms with spherical heads, each of said heads located in one of said recesses;

guiding pieces supporting rolling contact members, said guiding pieces comprising a radially extending cylindrical inner aperture radially movably and articulatably slidingly engaged by one of said spherical heads and longitudinally directed guiding grooves holding said rolling contact members rolling in said running grooves;

wherein said guiding grooves are provided with end stops at both ends and a free rolling path between said end stops for said rolling contact members in said guiding grooves, and guiding tracks in said outer joint part for said guiding pieces being provided in the form of recessed longitudinal flutes inside said running grooves.

2. A joint according to claim 1 wherein a plurality of rolling contact members are held in one guiding groove respectively between said axial end stops.

3. A joint according to claim 1 wherein one rolling contact member being held between two of said axial end stops in each of said guiding grooves with a plurality of said guiding grooves being disposed in alignment and being formed on each side of one of said guiding pieces.

4. A joint according to claim 1 wherein each of said end stops being produced integral with said guiding pieces.

5. A joint according to claim 1 wherein each of said end stops being formed members placed on said sides of said guiding pieces.

6. A joint according to claim 1 wherein said end stops being formed as plate metal elements transversely slidable onto said guiding pieces.

7. A joint according to claim 1 wherein a thickness of said guiding pieces is smaller than a diameter of said rolling contact members provided in the form of balls.

8. A joint according to claim 1 wherein said guiding pieces being planar plate metal parts.

9. A joint according to claim 1 wherein each of said guiding grooves comprise two parallel contact regions in contact with said rolling contact members.

10. A joint according to claim 1 wherein each of said guiding grooves comprise three parallel contact regions with said rolling contact members.

11. A joint according to claim 1 wherein a pair of guiding shoes are placed on said sides of said guiding pieces in guiding contact with said guiding grooves in said outer joint part.

12. A joint according to claim 11 wherein said guiding shoes simultaneously form said axial end stops.

13. A constant velocity universal joint of the tripod type comprising:

an outer joint part with three axis-parallel recesses, each forming circumferentially opposed pairs of running grooves, an inner joint part with three circumferentially distributed radial arms with spherical heads, each of said heads located in one of said recesses:

guiding pieces supporting rolling contact members, said guiding pieces comprising a radially extending cylindrical inner aperture radially movably and articulatably slidingly engaged by one of said spherical heads and longitudinally directed guiding grooves holding said rolling contact members rolling in said running grooves, wherein said guiding grooves are provided with end stops at both ends and a free rolling path between said end stops for said rolling contact members in said guiding grooves; and said guiding pieces have direct contact with guiding tracks in said outer joint part.

* * * * *